United States Patent [19]

Koch et al.

[11] Patent Number: 4,589,024

[45] Date of Patent: * May 13, 1986

[54] TWO-DIMENSIONAL SEMICONDUCTOR IMAGE SENSOR WITH REGULATED INTEGRATION TIME

[75] Inventors: Rudolf Koch, Unterhaching; Heiner Herbst, Munich, both of Fed. Rep. of Germany

[73] Assignee: Siemens Aktiengesellschaft, Berlin & Munich, Fed. Rep. of Germany

[*] Notice: The portion of the term of this patent subsequent to Jan. 29, 2002 has been disclaimed.

[21] Appl. No.: 409,628

[22] Filed: Aug. 19, 1982

[30] Foreign Application Priority Data

Sep. 25, 1981 [DE] Fed. Rep. of Germany ....... 3138240

[51] Int. Cl.[4] .............................................. H04N 3/12
[52] U.S. Cl. ..................................... 358/213; 357/24
[58] Field of Search ................ 358/213, 212; 250/578; 357/24 LR

[56] References Cited

U.S. PATENT DOCUMENTS

| | | | |
|---|---|---|---|
| 4,189,749 | 2/1980 | Hiroshima et al. | 358/167 |
| 4,233,632 | 11/1980 | Akiyama | 358/212 |
| 4,380,755 | 4/1983 | Endlicher et al. | 382/62 |

OTHER PUBLICATIONS

"Low-Noise MOS Area Sensor with Antiblooming Photodiodes", S. Ohba et al., IEEE Journal of Solid-State Circuits, vol. SC-15, No. 4, Aug. 1980, pp. 747-752.
"Charge-Injection Imaging: Operating Techniques and Performances (sic) Characteristics," H. Burke et al., IEEE Journal of Solid-State Circuits, vol. SC-11, Feb. 1976, pp. 121-128.

Primary Examiner—Gene Z. Rubinson
Assistant Examiner—Robert G. Lev
Attorney, Agent, or Firm—Hill, Van Santen, Steadman & Simpson

[57] ABSTRACT

A two-dimensional image sensor integrated on a semiconductor substrate has a plurality of sensor elements disposed in rows and columns. The sensors in each row and column are individually selected in succession via parallel outputs of a first vertical shift register for readout of the sensor elements. Regulation of the integration time during which charge carriers collect in the sensor elements due to incident light is achieved by selecting the sensor elements in each row a further n times via a second vertical shift register after each readout of the charges optically generated therein and within the time span during which the charges collected in the sensor elements of the next n rows are respectively transferred for readout into the column lines. The further n selections eliminate charges formed in the interim in the column lines so that the integration time of all sensor elements is variably shortened by the duration of readout of the n rows.

16 Claims, 5 Drawing Figures

TWO-DIMENSIONAL SEMICONDUCTOR IMAGE SENSOR WITH REGULATED INTEGRATION TIME

BACKGROUND OF THE INVENTION

1. Field of the Invention

The present invention relates to two dimensional semiconductor image sensors, and in particular to such an image sensor with controlled or regulated integration time.

2. Description of the Prior Art

A two dimensional semiconductor image sensor with a number of sensor elements disposed in rows and columns on a semiconductor substrate is described, for example, in the article "Low-Noise MOS Area Sensor With Antiblooming Photodiodes," Ohba et al, IEEE Journal of Solid-State Circuits, Vol. SC-15, No. 4, August, 1980 at pages 747 through 752. In the image sensor described therein, all lines are controllable by means of allocated parallel outputs of a vertical shift register for selecting the individual sensor elements. The outputs of the sensor elements are connected in the selected state to the column lines and a sensor output is provided for a sequential readout of the signals of the sensor elements transmitted in parallel on the column lines which correspond to the amount of optically-generated charge carriers resulting from light incident on the sensors.

A disadvantage of such conventional image sensors is that the integration time, which is the time during which the sensors are connected to an operating voltage so that charge carriers can be generated within the sensors, is fixed and cannot be changed in order to adapt to different uses of the image sensor and different types of incident light to which the sensors may be exposed.

SUMMARY OF THE INVENTION

It is an object of the present invention to provide a two-dimensional semiconductor image sensor which permits control or regulation of the integration time of the image sensor.

It is a further object of the present invention to provide such an image sensor wherein the integration time is controllable in small steps over a large control range so that very precise regulation of the output signals of the image sensor can be attained.

The above objects are inventively achieved in an image sensor which has a plurality of sensor elements disposed in rows and columns on a semiconductor substrate with all sensors in each column being connected to respective column lines which are in turn connected to the outputs of a vertical shift register, and all sensors in each column being respectively connected to column lines which are in turn connected to the outputs of a horizontal shift register. The vertical and horizontal shift registers control readout of the sensor elements by permitting transfer of the charge carriers generated in the sensor elements in the rows and columns to be transferred to subsequent processing and evaluating means for developing a final output signal. The sensor elements are periodically connected to a supply or operating voltage, during which time optically-generated charge carriers are collected in the sensor elements corresponding to the light incident thereon. The time span during which such charge carriers are generated within the sensor elements is defined as the integration time. The integration time for the sensor elements in the device disclosed herein is controlled by a second vertical shift register having a plurality of outputs to which each of the row lines are connected. The second vertical shift register selects each row for readout a further n times after each readout caused by the first vertical shift register and within the time spans during which the charges collected in the sensor elements in the next n rows are transferred for readout by means of selection of the column lines. The additional n selections eliminate charges which are formed in the interim during readout of the column lines so that the integration time of all sensor elements is shortened by the duration of the n rows, and can therefore be varied as needed.

Although the image sensor disclosed and claimed herein has application in any number of optoelectronic devices, the image sensor has particular utility in electronic cameras which may be employed for generating images which are subsequently transferred to a video recorder or displayed on a video screen such as a television.

DESCRIPTION OF THE PREFERRED EMBODIMENTS

Figure 1:
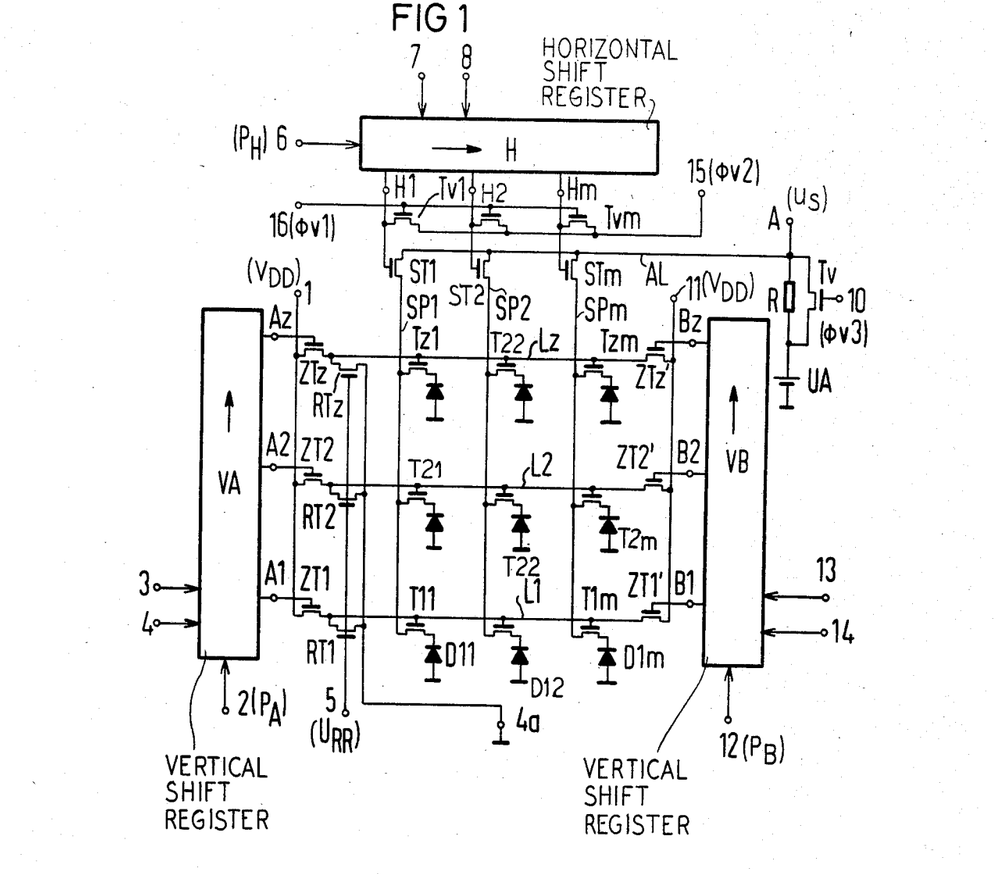
FIG. 1 is a circuit diagram for a two-dimensional semiconductor image sensor constructed in accordance with the principles of the present invention.

A monolithically integratable circuit with a two-dimensional semiconductor image sensor is shown in FIG. 1. The circuit may be integrated on a semiconductor substrate (not shown). The image sensor has a plurality of sensor elements disposed in rows and columns on the substrate. The sensor elements may be any suitable device which generates charge in response to light incident thereon such as, for example, photodiodes as shown in the embodiment of FIG. 1. The photodiodes disposed in the first row are referenced D11 through D1m. Each photodiode D11 through D1m is connected in series with the switching (source-drain) segment of selection transistors T11 through T1m, each of the selection transistors T11 through T1m having a gate connected to a common row line L1. The common row line L1 is connected to a terminal 1 through the switching segment of a row selection transistor ZT1. The terminal 1 is connected to a constant voltage $V_{DD}$.

The gate of the row selection transistor ZT1 is connected to one parallel output A1 of a first vertical shift register VA, which has a signal input 2 and clock pulse inputs 3 and 4. The row line L1 is also connected through the switching segment of a reset transistor RT1 to a circuit point 4a which is at reference potential. The gate of the reset transistor RT1 is at a terminal 5 which is connected to a voltage $U_{RR}$.

The further photodiodes and selection transistors of the image sensor are connected in an analogous manner to row lines L2 through Lz which are in turn connected to the terminal 1 through row selection transistors ZT2 through ZTz. The gates of the row selection transistors ZT2 through ZTz are in turn connected to parallel outputs A2 through Az of the first shift register VA. Further reset transistors RT2 through RTz are provided which are similarly connected to the row lines L2 through Lz, each having a gate connected to the terminal 5.

The selection transistors T11 through Tz1 which are allocated to the photodiodes disposed in one column are connected to a common column line SP1 which is in turn connected to a read-out line AL through a column selection transistor ST1. The gate of the column selection transistor ST1 is connected to a parallel output H1 of a horizontal shift register H. In an analogous manner, all selection transistors in the further columns are connected to further common column lines SP2 through SPm which are in turn connected to the readout line AL through further column selection transistors ST2 through STm. The gates of the further column selection transistors ST2 through STm are respectively connected to further parallel outputs H2 through Hm of the horizontal shift register H. The horizontal shift register H has a signal input 6 and clock pulse inputs 7 and 8.

The gates of the column selection transistors ST1 through STm are also connected to a terminal 15 through the switching segments of respective transistors Tv1 through Tvm. The gates of the switching transistors Tv1 through Tvm are connected to a terminal 16. A clock pulse voltage $\phi v1$ is supplied to the terminal 16 and a clock pulse voltage $\phi v2$ is supplied to terminal 15.

The readout line AL is connected to reference potential through a resistor R and a voltage source UA. Additionally, the switching segment of a transistor Tv is connected in parallel with the resistor R and has a gate connected to a terminal 10 which is supplied with a clock pulse voltage $\phi v3$. The junction of the readout line AL and the resistor R is the sensor output A at which a sensor output voltage us appears.

A second vertical shift register VB has parallel outputs B1 through Bz which are connected to the respective gates of further row selection transistors ZT1' through ZTz'. The row lines L1 through Lz are connected through the switching segments of the further row selection transistors ZT1' through ZTz' to a circuit point 11 which is connected to a constant voltage $V_{DD}$. The second vertical shift register VB has a signal input 12 and clock pulse inputs 13 and 14.

The shift registers VA, H and VB may be, for example, dynamic two phase shift registers. A voltage $P_A$ is supplied to the signal input 2 of the first vertical shift register VA, and inputs 3 and 4 are supplied with respective clock pulse voltages $\phi A1$ and $\phi A2$. A voltage $P_H$ is supplied to the signal input 6 of the horizontal shift register H and clock pulse voltages $\phi H1$ and $\phi H2$ are supplied to the respective inputs 7 and 8. The second vertical shift register VB is supplied with a voltage $P_B$ at the signal input 12, and is connected to clock pulse voltages $\phi B1$ and $\phi B2$ at the respective inputs 13 and 14.

Figure 2:
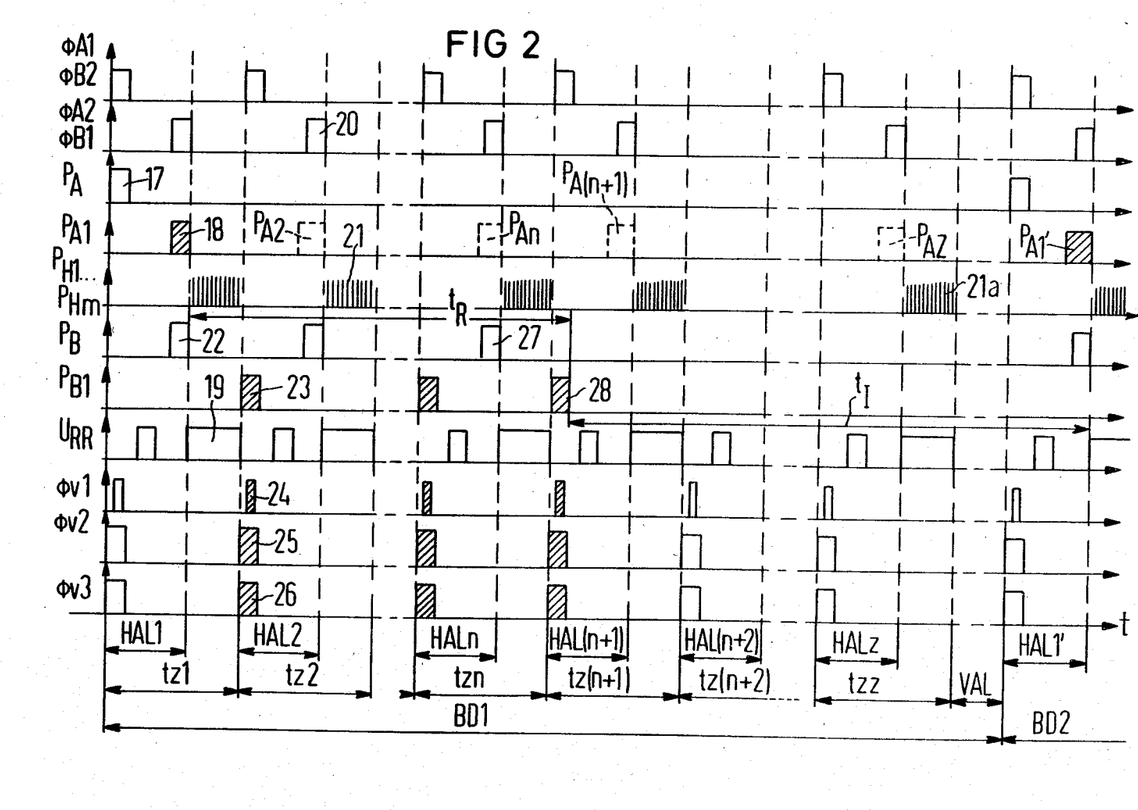
FIG. 2 is a voltage/time diagram for the voltages for operating the circuit shown in FIG. 1.

The above voltages and clock pulse voltages are illustrated with respect to time t in FIG. 2. The clock pulse voltages $\phi A1$ and $\phi B2$ are identical, so that the pulses shown in the top pulse train in FIG. 2 represent both those clock pulse voltages. Similarly, the clock pulse voltages $\phi A2$ and $\phi B1$ are identical, so that the pulse train which is second from the top in FIG. 2 represents both those clock pulse voltages.

When a voltage pulse $P_A$, such as the pulse referenced at 17 in FIG. 2 which may, for example, represent a logical "1", which coincides with a clock pulse $\phi A1$ is supplied to the signal input 2 of the shift register VA, a pulse $P_{A1}$ indicated at 18 in FIG. 2 appears at the shift register output A1 simultaneously with the next clock pulse $\phi B1$. By means of the pulse $P_{A1}$, the row line L1 is connected through the conductively switched transistor ZT1 to the terminal 1 which is at the potential $V_{DD}$, so that all of the selection transistors T11 through T1m are switched to a conductive state. As a result of the exposure of the sensor elements D11 through D1m to incident light, electrical charges are collected therein and are transmitted to the associated respective column lines SP1 through SPm. In a following time interval, the pulses $P_{H1}$ through $P_{Hm}$ appear in rapid succession at the parallel outputs H1 through Hm of the horizontal shift register 8. The pulses $P_{H1}$ through $P_{Hm}$ are derived from a pulse $P_H$ (a logical "1") supplied to the input 6 by means of the clock pulse $\phi H1$ and $\phi H2$. As a result the column selection transistors ST1 through STm are each briefly switched to a conductive state in non-overlapping succession. The charges transmitted via the column lines are thus sequentially connected over the readout line AL to the resistor R, causing corresponding voltages to occur at the output A which form the sensor output signal $u_s$. By means of a pulse $U_{RR}$, referenced at 19 in FIG. 2, the row line L1 is subsequently set to the reference potential via the reset transistor RT1, so that the transistors T11 through T1m are again in a non-conducting state. The time span from the beginning of a clock pulse in the pulse train $\phi A1$ to the end of the next-occurring clock pulse in the pulse train $\phi B1$ is defined as the horizontal blanking interval, such as the interval HAL1 in FIG. 2, and the time span from the beginning of a pulse in the pulse train $\phi A1$ to the end of the next-occurring pulse $P_{Hm}$ is defined as the row duration, such as the row duration tz1 shown in FIG. 2.

Upon the occurrence of the next-following clock pulse $\phi B1$, which is referenced at 20 in FIG. 2, a pulse $P_{A2}$ appears at the output A2, by means of which all photodiodes connected to the row line L2 are selected and the charges collected in those photodiodes is transmitted to the associated column lines SP1 through SPm. By means of a next-occurring sequence 21 of pulses $P_{H1}$ through $P_{Hm}$, the charge is again sequentially read out, again causing a corresponding sensor signal $u_s$ to appear at the output A. This readout operation is repeated row by row until, within the row duration tzz, a pulse $P_{Az}$ occurs at the shift register output Az and the charges collected in the photodiodes connected to the line Lz are read out at the output A by a sequence 21a of pulses $P_{H1}$ through $P_{Hm}$, again in the form of an output sensor signal $u_s$. A time interval defined as the vertical blanking interval VAL follows the row duration tzz, and the time span from the beginning of the first blanking interval HAL1 to the end of the vertical blanking interval VAL is defined as the image duration BD1. Within the next successive image duration BD2, a horizontal blanking interval HAL1' again first occurs during which the next charge transfer from the photodiodes D11 through D1m to the row line L1 takes place as described above.

If no further readout steps were undertaken the photodiodes D11 through D1m connected to the common row line L1 would have a fixed integration time equal to the entire time span from the beginning of the reset pulse 19 to the end of the pulse $P_{A1'}$. In accordance with the principles of the present invention, a pulse $P_B$ which coincides with the clock pulse $\phi B1$ is supplied to the input 12 of the second vertical shift register VB within the horizontal blanking interval HL1. This pulse may, for example, represent a logical "1" and is referenced in FIG. 2 at 22. The pulse 22 causes a pulse $P_{B1}$ (referenced at 23 in FIG. 2) to appear at the shift register output B1 coincident with the next-occurring clock pulse $\phi B2$. The pulse $P_{B1}$ again connects the line L1 to the supply voltage $V_{DD}$ via the transistor ZT1' and the terminal 11. The charges which have collected in the photodiodes D11 through D1m until the end of the pulse 19 are transferred to the column lines SP1 through Spm. Further clock pulses $\phi v1$, $\phi v2$ and $\phi v3$, which are respectively referenced in FIG. 2 at 24, 25 and 26 effect a switching of the transistors Tv1 through Tvm to a conductive state, cause the transistors ST1 through STm to also be switched to a conducting state, and effect a bridging of the resistor R by the transistor Tv. The result is that charges are simultaneously supplied to the sensor output A, which is now at a constant voltage of UA, so that the charges are destroyed without generating corresponding output signals. This charge cancellation which occurs during the blanking interval HAL2 as a consequence of the pulse 22 in the preceding blanking interval HAL1, is indicated in FIG. 2 by means of shading of the pulses 23, 24, 25 and 26.

In the course of row durations Tz1 through Tzn, a total of n pulses $P_B$ are read into the shift register VB, the last pulse $P_B$ being indicated in FIG. 2 at 27, the charges optically collected in the photodiodes D11 through D1m during the row durations are respectively cancelled during the horizontal blanking intervals HAL2 through HAL(n+1). It is only during the following line duration tz(n+1) and the following time span to the beginning of $P_{A1'}$ that exposure-dependent charges again collect without cancellation in D11 through D1m, these charges being transferred to the column lines SP1 through SPm by means of the pulse $P_{A1'}$ and being subsequently read out as a new sensor signal $u_s$. Thus an integration time $t_I$ for the photodiodes D11 through D1m results which commences at the end of the last pulse $P_{B1}$ occurring within the image duration BD1 (referenced at 28 in FIG. 2) and lasts to the end of the pulse $P_{A1'}$. The time span from the end of the pulse 18 through the end of the pulse 28, in which the charges in the photodiodes are repeatedly cancelled, is defined as the reset time $t_R$.

Operation of the image sensor in accordance with the principles of the present invention as described above permits regulation or control of the length of the integration time for the photodiodes in the individual rows, such as the photodiodes connected to the row line L1, by selection of the number n of pulses $P_B$ occurring within BD1. As n becomes larger, the reset time $t_R$ becomes larger and the integration time $t_I$ becomes correspondingly smaller. The same applies to the photodiodes in the other row lines L2 through Lz for which corresponding reset times and integration times respectively offset by a row duration are present which are respectively augmented to complete a time span which corresponds to BD1. The integration time for all of the rows of photodiodes can thus theoretically be varied between zero and the image duration time, for example BD1, in steps which correspond to a row duration, for example tz1.

The number n may also be selected in order to adjust the sensor signal $u_s$ appearing at the output A in order to maintain a relatively constant mean amplitude for those sensor signals, even when the image sensor is radiated by different luminous intensities E. In such a situation, the number n is selected as a function of the respective value of E. Given a total number of rows z and a row duration tz, and leaving the vertical blanking interval out of consideration, the reset time $t_R$ is determined by the following equation:

$$t_R = n \cdot tz$$

and the integration time $t_I$ is defined by the equation:

$$t_I = (z-n) \cdot tz.$$

The mean amplitude of the output signal $u_s$ of the image sensor is proportional to E and to $t_I$ such that:

$$u_s = c_1 \cdot E \cdot t_I$$

wherein $c_1$ denotes a first constant. In order for $u_s$ to remain constant, the following condition must be satisfied:

$$t_I \cdot E = c_2$$

wherein $c_2$ represents a second constant. Combining the above equations yields the expression:

$$n = z - \frac{c_3}{E}$$

wherein $c_3$ denotes a third constant.

Figure 3:
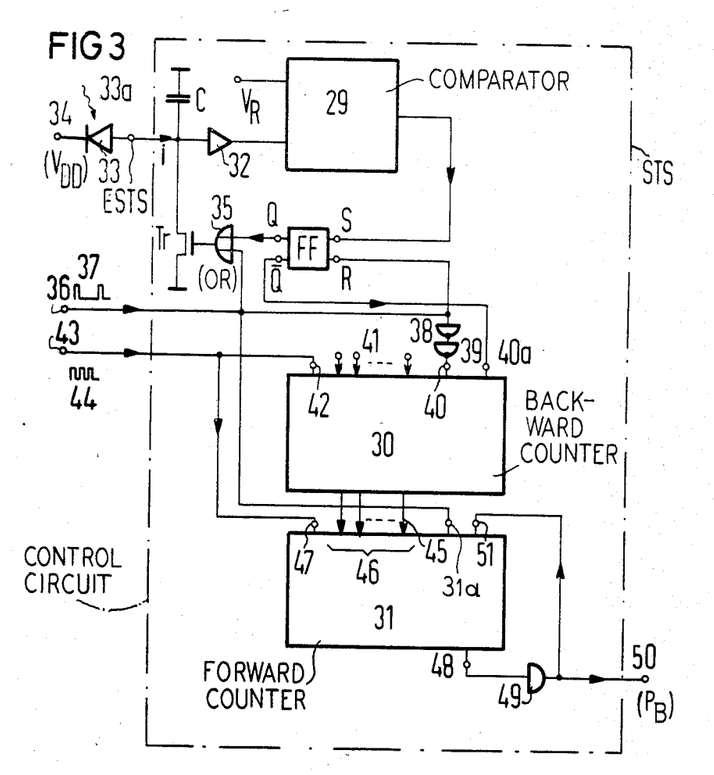
FIG. 3 is a control circuit for use in combination with the circuit shown in FIG. 1 for maintaining the amplitude of the output of the circuit shown in FIG. 1 at a constant level independently of the intensity of light which is incident on the sensor elements.

A control arrangement is shown in FIG. 3 for holding the mean amplitude of the sensor signal $u_s$ constant independently of the luminous intensity E which radiates the image sensor. The control circuit STS consists of a comparator 29, a backward counter 30 and a forward counter 31. The first input of the comparator 29 is connected to a reference voltage $V_R$ and its second input is connected to the output of a buffer amplifier 32 whose input is connected to a photodiode 33 which is biased in the blocking direction by means of a terminal 34 connected to the voltage $V_{DD}$. The junction of the buffer amplifier 32 and the photodiode 33 is connected to the reference potential of the circuit by two paths, a first path being via a capacitor C and a second path being via the switching segment of a transistor Tr. The output of the comparator 29 is connected to the S input of an RS flip-flop FF whose output Q is connected to the first input of an OR gate 35. The output of the OR gate 35 is connected to the gate of the transistor Tr. The second input of the OR gate 35 is connected to a terminal 36 at which the image-frequency pulses 37 occur which chronologically fall in the respective vertical blanking intervals VAL shown in FIG. 2. The terminal 36 is further connected to the R input of the flip-flop FF and is connected to the set input 40 of the counter 30 via a series connection of two inverters 38 and 39. The $\overline{Q}$ output of the flip-flop FF is connected to the enabling input 40a of the counter 30. The counter 30 can be set via an input 41 to the number of rows z of the image sensor. The counting input 42 of the counter 30 is connected to a terminal 43 at which row-frequency pulses 38 occur which respectively lie within the horizontal blanking intervals HAL1 etc. The counter reading of the backward counter 30 can be transmitted over lines 45 to an input 46 of the forward counter 31. The forward counter 31 has a counting input 47 which is also connected to the terminal 43. The output 48 for the counter carry is connected via an inverter 49 to an output 50 of the control circuit STS which is connected to the input 12 of the second vertical shift register VB and at which the pulse $P_B$ appears. The output of the inverter 49 is also connected to the enabling input 51 of the forward counter 31.

The capacitor C is reset to the reference potential in every vertical blanking interval VAL by a pulse 37 which switches the transistor Tr1 to a conducting state. As a result of the exposure of the photodiode 33 with light rays 33a, which also expose the image sensor, a current which is proportional to the luminous intensity E on the photodiode 33 is generated which charges the capacitor C, so that a voltage is developed across the capacitor C. When the voltage across the capacitor C, which is supplied to one input of the comparator 29, reaches the value of $V_R$ the comparator 29 switches states, that is, the output of the comparator 29 changes from a logical "0" to a logical "1". The time $t_u$ from the resetting of the capacitor C (that is, from the occurrence of a pulse 37) up to the switching of the comparator 29 is defined by the equation:

$$t_u = c_3 \frac{C \cdot V_R}{E} = \frac{c_4}{E}.$$

A comparison of the equation for $t_I$ with the above equation for $t_u$ shows that both those values are inversely proportional to the luminous intensity E. As soon as the comparator 29 emits a logical "1", the flip-flop FF is set, whereby the Q output switches from a logical "0" to a logical "1" which accordingly causes the transistor Tr to again briefly switch to a conducting state via the OR gate 35 and thus discharges the capacitor C. Simultaneously the enabling input 40a of the counter 30, which was heretofore occupied with a logical "1", is now supplied with a logical "0" from the output $\bar{Q}$. Thus the counter 30, which had been previously set to the set number z by the pulse 37 and had subsequently counted the incoming row-frequency pulses 44, is arrested. The counter reading thereby reached in the counter 30 corresponds to the expression:

$$z - \frac{t_I}{tz} = z - \frac{(z-n) \cdot tz}{tz} = n$$

and thus corresponds to the reset time $t_R$. By means of a pulse 37 which is supplied to the set input 31a of the forward counter 31, the counter reading reached by the backward counter 30 is transferred to the input 46 of the forward counter 31 at the beginning of the next vertical blanking interval VAL. Beginning from zero, the counter 31 then counts the incoming row-frequency pulses 44 until it has reached the same counter reading. During this counting operation, the output 48, which is the carry output for the forward counter 31, is at a logical "0" so that a logical "1" is present at the output 50. When the counter 31 reaches the same counter reading as was previously reached by the backward counter 30, a logical "1" is emitted at the output 48 which resets the output 50 to a logical "0" and also blocks the forward counter 31 via its input 51. The duration of the counting operation in the counter 31 corresponds to the reset time $t_R$. In the next vertical blanking interval VAL, the counter 31 is again reset to zero by means of a pulse 37. Independently of the counting operation of the counter 31, the backward counter 30 also operates and determines the reset time for the next picture duration BD.

Figure 4:
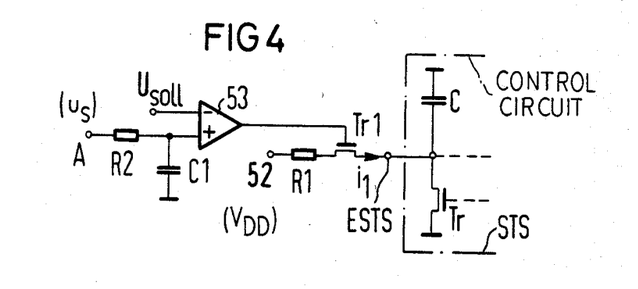
FIG. 4 is an additional circuit for use in combination with the circuit shown in FIG. 1 and FIG. 3.

A further embodiment for the circuit of FIG. 3 is shown in FIG. 4 wherein a regulation of the mean amplitude of the sensor signal $u_s$ to a rated value $U_{soll}$ can be achieved. To this end the input ESTS of the control circuit STS is connected via the source-drain segment of a transistor Tr1 and a high resistance resistor R1 to a terminal 52 which is supplied with the voltage $V_{DD}$. The resistor R1 permits the transistor Tr1 to function as a controllable current source with a high internal resistance. The gate of the transistor Tr1 is connected to the output of a differential amplifier 53 having a negative input which is supplied with the rated voltage $u_{soll}$ and having a positive input connected via a resistor R2 to the sensor output A. The positive input of the differential amplifier 53 is also connected to the reference potential for the circuit through a capacitor C1.

In the embodiment shown in FIG. 4, the sensor signal $u_s$ is averaged over the duration of a plurality of images by means of the low pass filter formed by C1 and R2. The averaged signal is compared to the rated voltage $u_{soll}$ in the differential amplifier 53, and the difference of the input signals supplied to that amplifier controls the output current $i_1$ of the transistor Tr1 functioning as a constant current source. Thus, the current $i_1$ replaces the current i shown in FIG. 3 from the photodiode 33. The control circuit STS then functions precisely as described above in connection with FIG. 3. In the embodiment shown in FIG. 4, the averaged value of $u_s$ is matched to the rated value $u_{soll}$ except for a repetitive error, so that a very precise control of the sensor signal is achieved.

Figure 5:
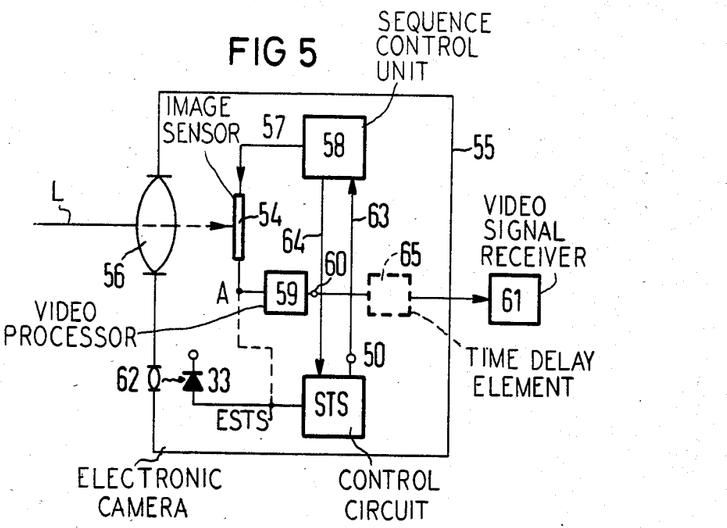
FIG. 5 is a schematic diagram of an electronic camera embodying a semiconductor image sensor constructed in accordance with the principles of the present invention.

The employment of a semiconductor image sensor constructed in accordance with the principles of the present invention in an electronic camera 55 is shown in FIG. 5. An image sensor of the type shown in FIG. 1 is used in the electronic camera 55 in the form of a monolithically integrated semiconductor arrangement 54. The camera 55 has a lens 56 for directing incident light L onto the image sensor 54. The required voltages and clock pulses are supplied to the image sensor 54 via lines 57 from a sequence control unit 58. The sensor output signals (appearing at the output A shown in FIG. 1) are supplied to a video processor 59 for processing into a video signal which is provided with horizontal and frame frequency pulses. The video signal proceeds via an output 60 to a video signal receiver 61, which may be a video recorder or a television set. In accordance with the control circuit embodiment shown in FIG. 3, a photodiode 33 which is illuminated by an auxiliary optics system 62 ESTS may be connected to the output A of the image sensor 54 as explained in connection with FIG. 4, this being indicated in FIG. 5 by means of a dashed line. The pulses $P_B$ occurring at the output 50 are supplied over the line 63 to the sequence control unit 58 and from there to the image sensor 54. The pulses 37 and 34 (shown in FIG. 3) required for operating the control circuit STS are generated in the sequence control unit 58 and are transmitted over a line 64 to the control circuit STS. The electronic camera 55 may be a movie camera or a stationary image camera. If the electronic camera 55 is a stationary image camera, and if a control circuit STS for the sensor signals $u_s$ is employed, a time delay element 65 may be interconnected between the output 60 of the video processor 59 and the video signal receiver 61. The time delay element 65 enables forwarding of the video signals only when the searching for focusing the camera to a specific object has decayed. In the embodiment shown in FIG. 5, the control or regulation of the integration time of the sensor elements on the image sensor 54 replaces the hitherto standard exposure control in electronic cameras which conventionally utilizes mechanical or electromechanical means for aperture actuation and/or an exposure time control.

The image duration, such as BD1, may be set to a video norm of 20 ms, in which case the horizontal blanking intervals, such as HAL1, amount to 12 $\mu$s, the line duration, such as tz1, amounts to 64 $\mu$s, and the vertical blanking intervals, such as VAL1, amount to approximately 1.2 ms.

In place of the photodiodes such as D11 in the sensor array, CID sensor elements may be employed each of which consists of a pair of MIS capacitors disposed next to each other with the outer electrode of one capacitor of such a pair being connected to the row line and the outer electrode of the other capacitor in the pair being connected to the associated column line. An image sensor employing CID sensor elements is described in the article "Charge-Injection Imaging: Operating Techniques and Performances (sic) Characteristics," Burke et al, IEEE Journal of Solid State Circuits, Vol. SC-11, February 1976 at pages 121 through 128, particularly in FIGS. 1 and 2 of that article. For the purpose of cancelling the charges collected in the sensor elements during the reset time $t_R$, both the column lines and the associated row lines are simultaneously reset to the reference potential of the circuit.

Although modifications and changes may be suggested by those skilled in the art it is the intention of the inventors to embody within the patent warranted hereon all changes and modifications as reasonably and properly come within the scope of their contribution to the art.

We claim as our invention:

1. A two-dimensional semiconductor image sensor comprising:

a plurality of light-sensitive sensor elements for generating charge carriers in response to light incident thereon, said sensor elements disposed in rows and columns on a semiconductor substrate;

a plurality of row lines respectively connecting all sensor elements in each of said rows;

a plurality of column lines respectively connecting all sensor elements in each of said columns;

a first vertical shift register having a plurality of parallel outputs for sequentially selecting said rows of sensor elements for readout thereof over said column lines at a sensor output;

a plurality of first row selection transistors respectively interconnected between one end of said row lines and a constant voltage and each having a control electrode connected to one of said parallel outputs of said first vertical shift register;

a second vertical shift register having a plurality of parallel outputs for sequentially selecting said rows of sensor elements for readout thereof over said column lines at said sensor output;

a plurality of second row selection transistors respectively interconnected between the other end of said row of lines and a constant voltage and each having a control electrode connected to one of said parallel outputs of said second vertical shift register;

a means for periodically connecting said column lines to said sensor output; and a means for periodically connecting said sensor output to a constant voltage, whereby said first vertical shift register periodically effects a first readout of a selected duration of said rows of sensor elements and said second vertical shift register periodically effects a subsequent second readout of said rows of sensor elements only when said sensor output is connected to a constant voltage.

2. The semiconductor image sensor of claim 1 further comprising:

a plurality of row reset transistors respectively interconnected between said rows and a reference potential for resetting said sensor elements in said rows.

3. The semiconductor image sensor of claim 1 wherein said means for periodically connecting said column lines to said sensor output comprises:

a horizontal shift register having a plurality of parallel outputs;

a column readout line connected to said sensor output; and a plurality of column selection transistors respectively interconnected between said column lines and said column readout line and each having a control electrode connected to one of said parallel outputs of said horizontal shift register.

4. The semiconductor image sensor of claim 3 wherein said means for periodically connecting said column lines to said sensor output further comprises:

a plurality of switching transistors interconnected between said control electrodes of said column selection transistors and a first sensor terminal and each having a control electrode connected to a second sensor terminal, said first and second sensor terminals being respectively supplied with first and second clock pulse voltages for effecting a simultaneous readout of said columns of sensor elements at said sensor output when said sensor output is connected to a constant voltage.

5. The semiconductor image sensor of claim 1 wherein said means for periodically connecting said sensor element to a constant voltage includes a resistor interconnected between a constant voltage source and said sensor output.

6. The semiconductor image sensor of claim 5 wherein said means for periodically connecting said sensor output to a constant voltage further includes an output switching transistor having a switching segment connected in parallel with said resistor and having a control electrode connected to an output clock pulse voltage for periodically connecting said sensor output to said constant voltage source.

7. The semiconductor image sensor of claim 1 wherein said second vertical shift register has a signal input and further comprising a control circuit having an output connected to said signal input for controlling operation of said second vertical shift register, said control circuit comprising:

a means for generating a control circuit input signal as a function of the luminous intensity of light incident on said image sensor;

a comparator having a first input connected to a comparator reference potential and a second input connected to said means for generating a control circuit input signal;

a capacitor interconnected between said second input of said comparator and ground;

an RS flip-flop having a set input connected to the output of said comparator;

a backward counter having an enabling input connected to the $\bar{Q}$ output of said RS flip-flop and a counting input, said backward counter being normally enabled and settable to a count equal to the number of rows of sensor elements;

a forward counter having a carry output, an enabling input and a counting input and being normally disenabled;

an inverter connected to said carry output and having an output connected to said enabling input of said forward counter and to said control circuit output;

said counting inputs of said forward and backward counters being connected to a row frequency clock pulse voltage;

a means supplied with a transfer clock pulse voltage for periodically transferring the count of said backward counter to said forward counter; and a means for resetting said capacitor when said RS flip-flop flips or when said count is transferred, whichever is earlier, whereby said capacitor develops a voltage overtime as a result of said input signal and said comparator sets said RS flip-flop when the voltage across said capacitor reaches said comparator reference potential, causing said RS flip-flop to flip thereby disenabling said binary counter after which the count of said binary counter is transferred to said forward counter which counts until reaching the count of said backward counter and which thereupon emits a signal at said carry output to said second vertical shift register and simultaneously disenabling said forward counter.

8. The semiconductor image sensor of claim 7 wherein said means for resetting said capacitor comprises:
   an OR gate having a first input connected to the Q output of said RS flip-flop and a second input connected to said transfer clock pulse voltage; and
   a transistor having a switching segment interconnected across said capacitor and having a control electrode connected to the output of said OR gate.

9. The semiconductor image sensor of claim 7 wherein said means for generating a control circuit input signal comprises a photodiode interconnected between a constant voltage source and said second comparator input.

10. The semiconductor image sensor of claim 7 wherein said means for generating a control circuit input signal comprises:
    a differential amplifier having a first input connected to a voltage which is a mean sensor signal rated value, and having a second input;
    an RC filter interconnected between said second input of said differential amplifier and said sensor output; and
    a high resistance constant current source interconnected between the output of said differential amplifier and said second input of said comparator, the output current of said current source being controllable by said differential amplifier for charging said capacitor in accordance with the difference between the voltage at said sensor output and said rated value.

11. The semiconductor image sensor of claim 10 wherein said high resistance current source comprises:
    a resistor connected to a constant current source; and
    a transistor having a switching segment interconnected between said resistor and said second input of said comparator and having a control electrode connected to the output of said differential amplifier.

12. The semiconductor image sensor of claim 1 further comprising a video processor connected to said sensor output operating in combination with said image sensor as an electronic camera for generating a video signal.

13. A method for operating a two-dimensional semiconductor image sensor having a plurality of sensor elements disposed in rows and columns and having a plurality of column lines respectively connecting all sensor elements in each column and a plurality of row lines respectively connecting all sensor elements in each row, comprising the steps of:
    sequentially selecting each of said rows for readout of the charge carriers collected in the sensor elements in said rows during a first readout over said column lines;
    periodically repeatedly reading out said sensor elements in each of said rows a total of n times after said first readout thereof during the time span during which the next-successive n rows are first read out;
    cancelling all charge carriers read out of said elements during said n readouts after said first readout thereof;
    determining the deviation of an output signal of said image sensor from a predetermined rated value;
    selecting n such that said deviation is minimized; and
    cyclically repeating the above steps.

14. The method of claim 13 wherein the step of repeatedly reading out said rows after said first readout thereof is further defined by selecting each of said rows for readout by means of signals supplied to parallel outputs of a vertical shift register having a selected input signal.

15. The method of claim 13 comprising the additional step of:
    selecting n as a function of the luminous intensity of the light which is incident on said two-dimensional image sensor such that a means amplitude of an output signal of said image sensor remains constant.

16. A method for operating a two-dimensional semiconductor image sensor having a plurality of sensor elements disposed in rows and columns and having a plurality of column lines respectively connecting all sensor elements in each column and a plurality of row lines respectively connecting all sensor elements in each row, comprising the steps of:
    sequentially selecting each of said rows for readout of the charge carriers collected in the sensor elements in said rows during a first readout over said column lines;
    periodically repeatedly reading out said sensor elements in each of said rows a total of n times after said first readout thereof during the time span during which the next-successive n rows are first read out;

cancelling all charge carriers read out of said sensor elements during said n readouts after said first readout thereof;

charging a capacitor by developing a voltage across said capacitor which is proportional to the luminous intensity of light incident on said image sensor;

simultaneously setting a backward counter with a count equal to the number of rows of sensor elements;

counting backward in said backward counter unit said voltage across said capacitor reaches a predetermined value;

transferring the count in said backward counter into a forward counter as an upper count limit;

counting in said forward counter until reaching said upper count limit;

supplying a signal to a vertical shift register from said forward counter, said vertical shift register having a plurality of parallel outputs, for initiating said n further read outs of the sensor elements in said rows;

resetting said capacitor to a reference potential; and cyclically repeating the above steps.

* * * * *